United States Patent Office 3,449,976
Patented June 17, 1969

3,449,976
ARRANGEMENT FOR REDUCING BACKLASH AND WEAR BETWEEN GEARS
Rector C. Fergason, Gadsden, Ala., assignor to Allis-Chalmers Manufacturing Company, Milwaukee, Wis.
Filed Sept. 1, 1967, Ser. No. 665,042
Int. Cl. F16h 55/18
U.S. Cl. 74—409                   9 Claims

ABSTRACT OF THE DISCLOSURE

A double bevel gear mounted on a vertical drive shaft is in geared engagement with bevel pinions on its respective upper and lower gear surfaces. The double bevel gear is capable of limited vertical movement on the drive shaft. A spring means supports the weight of the double bevel gear, thereby in effect rendering the double bevel gear weightless, and thereby equalizes the backlash of the upper and lower pinions with respect to the double bevel gear. The arrangement just described may be used for driving the cotton picking spindles of a cotton harvesting machine.

---

The present invention relates to an arrangement for reducing backlash and wear between gears. The invention is described and shown as embodied in, but not restricted to, an improved spindle drive gear arrangement for cotton harvesters or the like which equalizes backlash and wear of upper and lower gears engaging an intermediate or central drive gear.

In drum type cotton harvesters, the picking of the cotton is accomplished by rapidly revolving spindles which are secured to a rotating cylindrical drum in circumferential rows, which spindles may or may not be arranged in vertical rows. The spindles are driven by a series of vertically spaced gears secured to a central vertical drive shaft, which gears engage driven gears associated with the spindles in each horizontal row.

Difficulty has been experienced in equalizing backlash and wear of the upper and lower pinions driven by each central drive gear. Adjusting the gears mechanically was time consuming and presented an extremely difficult accessibility problem.

Accordingly, it is an object of the present invention to provide an arrangement for reducing backlash between mating gears.

It is another object of the present invention to provide an arrangement for automatically equalizing the backlash and wear of the upper and lower pinions driven by a central drive gear of a cotton harvester spindle drive assembly or the like.

It is another object of the invention to provide an arrangement for equalizing the backlash and wear of the upper and lower pinions driven by a central drive gear in which internal adjustments, repairs, or replacements are rarely necessary.

In achievement of these objectives, there is provided an embodiment of the invention comprising a drum type cotton harvester or the like having a central drive shaft on which are mounted a plurality of double bevel central drive gears in vertically spaced relation to each other. The central drive gears are mounted for limited vertical movement on the drive shaft. Each central drive gear is in geared engagement with an upper and lower horizontal row of bevel pinion gears each of which respectively drives a cotton picking spindle or the like.

In order to equalize backlash of the upper and lower pinions with respect to the central drive gear, spring means extend between the central drive gear and the central vertical shaft to nullify the effect of the gear weight on the lower pinions and thereby automatically equalize the backlash between the upper and lower spindle pinions.

Figure 1:
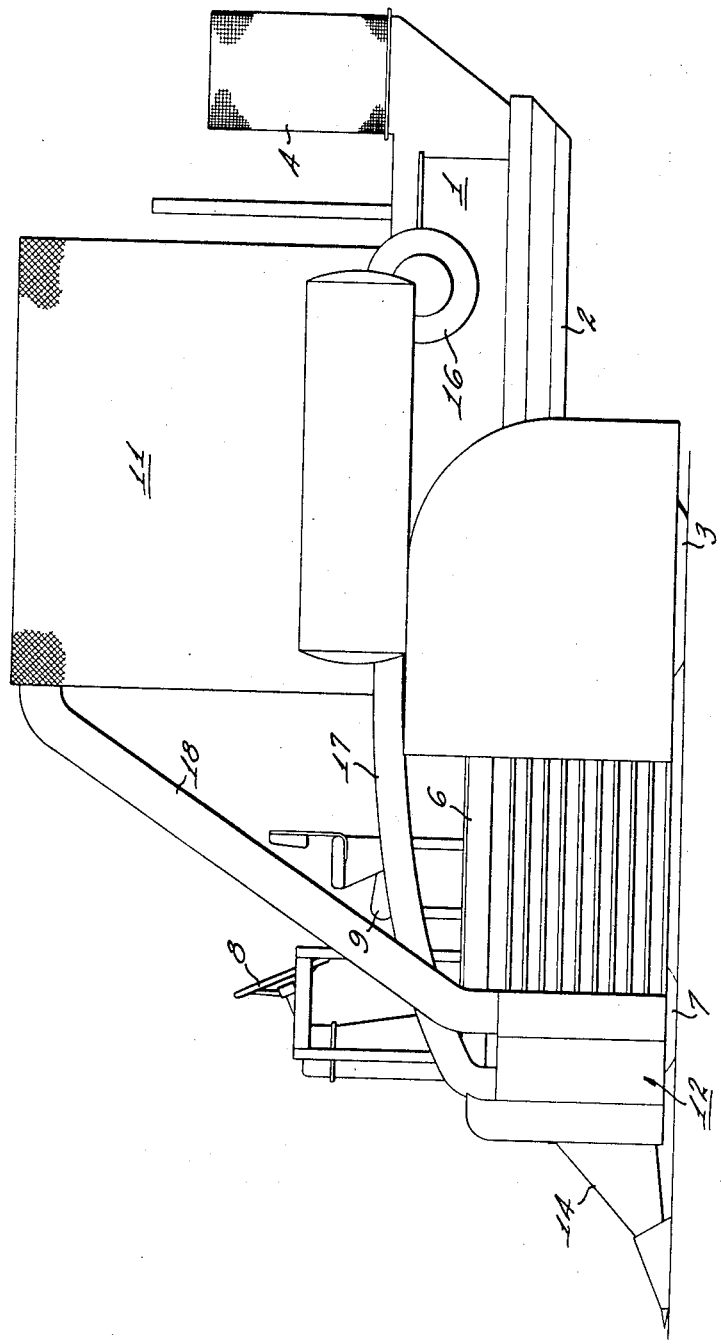
Figure 2:
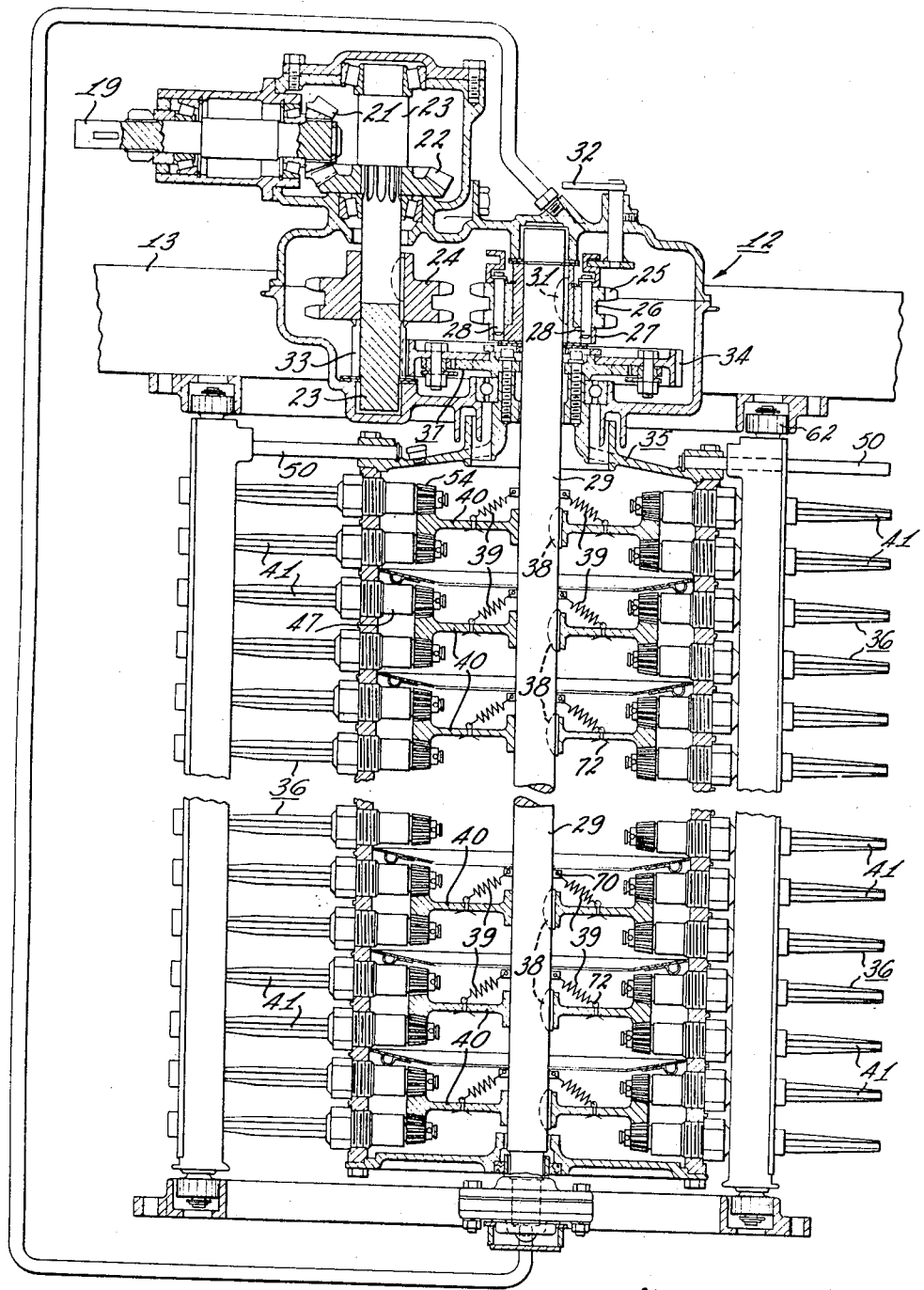

Further features of the invention will become obvious from the following description taken in connection with the accompanying drawings, wherein FIG. 1 is a side elevation of a cotton harvester embodying the invention; and FIG. 2 is a cross sectional view of a drum type cotton harvester embodying the invention showing the power train for driving the drum and picking spindles and showing the backlash equalizing arrangement of the invention.

Referring to FIG. 1, the cotton harvester embodying the invention consists generally of an engine 1 joined to an axle housing (not shown) ad supported thereby as a cantilever beam. A frame member 2 supports engine 1 from the axle housing. A pair of laterally spaced traction wheels 3 (only one is shown) are operatively connected to opposite ends of the axle housing in a conventional manner. Engine 1 is provided with an air intake cleaning screen 4 which is carried by the engine. A forwardly extending frame 6 is attached at its rear end on the axle housing. The forward end of frame 6 is supported on a dirigible wheel 7 which is operatively connected to steering wheel 8 carried by the front end of frame 6. An operator's seat 9 is carried by frame 6 rearwardly of the steering wheel 8. A picked cotton receiving basket 11 is carried on frame members 6 and 2 rearwardly of operator's seat 9. Cotton picker assemblies 12 are mounted on each side of the forward end of frame 6. These assemblies are carried by a subframe 13 (see FIG. 2) which is adjustably connected to frame 6 for vertical movement relative thereto. The forward end of assemblies 12 (see FIG. 1) are provided with plant dividers 14 which guide cotton plants into contact with cotton pickers which are positioned just rearwardly of the plant dividers. If further details of the stalk dividers are desired, reference may be had to U.S. patent application Ser. No. 456,399, now Patent No. 3,380,233, filed May 17, 1965 for Plant Divider for Harvesters. Frame 2 supports a blower 16 which is provided with a duct 17 which delivers pressurized air to picking assembly 12 and a cotton delivering duct 18 for depositing picked cotton into basket 11.

Engine 1 is provided with a power takeoff shaft (not shown) which is operatively connected to shaft 19 of picking unit 12 (see FIG. 2). A gear 21 is attached to shaft 19 for rotation therewith and gear 21 is drivingly engaged with gear 22 attached to shaft 23. A double sprocket 24 attached to shaft 23 is drivingly connected to double sprocket 25 by means of chains (not shown). Double sprocket 25 includes a center portion 27 upon which the outer portion 26 is journaled. These two portions 26 and 27 are selectively joined together by means of pins 28. Center portion 27 is keyed to shaft 29 for rotation therewith by conventional means such as half-moon key 31. Pins 28 can be raised vertically by raising handle 32 and the mechanism connected therewith to interrupt the driving connection between portions 26 and 27.

Beneath sprocket 24 a gear 33 is attached to shaft 23. Gear 33 is drivingly engaged with a gear 34 which surrounds shaft 29 and which rotates relative thereto and gear 34 is attached to drum 35 for rotation therewith. A ratchet mechanism 37 is interposed between drum 35 and gear 34 so that drum 35 can only be driven in one direction. If driven in the opposite direction, the ratchet mechanism interrupts the drive.

Reference numeral 35 designates the drum or cylinder of a cotton picking machine and which drum carries a plurality of cotton picking assemblies 36. Each picking assembly 36 includes a picking spindle 41. Pairs of horizontal rows of spindles 41 are driven by a double bevel gear 40 secured to drive shaft 29 by means of half-moon key 38, the radially inner end of each spindle being provided with a beveled pinion gear 54 which mates with gear 40.

For further details of the spindle assembly and of the stripper mechanism with which it cooperates, reference is made to my U.S. patent application entitled "Cotton Harvester," Ser. No. 656,811, filed July 28, 1967.

Half-moon keys 38 permits gears 40 to be self-aligning and permit a limited amount of vertical movement of gears 40 under the influence of springs 39.

In accordance with the invention, as best seen in FIG. 2, each double bevel gear 40 is biased in an upward direction by a pair of tension springs 39 connected to drive shaft 29 at a point above the respective bevel gear 40 by means of a pin 70 which extends through shaft 29. The opposite end of each spring is attached to an intermediate radial point on the upper surface of gear 40 by a cotter pin 72, or the like. The size and angle of springs 39 are proportioned to produce an upward force component of sufficient value to nullify the effect of the weight of gear 40 on thel ower spindle pinions and automatically equalize the backlash of the upper and lower spindle pinions 54 relative to double bevel gear 40.

While the invention has been shown and described as embodied in a cotton harvesting machine, obviously the invention is applicable in other environments where it is desirable to reduce backlash between gears.

It is obvious from the foregoing description and drawings that the detailed arrangement and construction of the various elements may be modified considerably without departing from the spirit of the invention which must not be considered as limited strictly to the construction shown and described.

The embodiments of the invention in which an exclusive property or privilege is claimed are defined as follows:

1. In combination, a first gear, said first gear including separate distinct gear means on respective opposite surfaces thereof, second and third gears respectively in geared engagement each with a different one of the separate distinct gear means on said respective opposite surfaces, and means biasing said first gear into a floating position between said second and third gears whereby to equalize the backlash of said second and third gears with respect to said first gear.

2. The combination defined in claim 1 in which said first gear includes gear means on the upper and lower surfaces thereof, said second and third gears being respectively in geared engagement with said lower and upper surfaces of said first gear.

3. The combination defined in claim 2 in which said means biasing said first gear into a floating position between said second and third gears is a spring means.

4. The combination defined in claim 1 in which said first gear is a double bevel gear and said second and third gears are bevel pinion gears.

5. The combination defined in claim 4 comprising a plurality of second gears in geared engagement with the lower surface of said first gear and a plurality of third gears in geared engagement with the upper surface of said first gear.

6. The combination defined in claim 1 in which said first gear is mounted for limited vertical movement.

7. The combination defined in claim 1 in which said first gear is keyed to a vertical shaft by a key means permitting limited vertical movement of said first gear.

8. The combination defined in claim 1 in which said first and second gears cooperate to drive a spindle on a cotton harvesting machine, and said first and third gears cooperate to drive another spindle on said machine.

9. The combination defined in claim 1 in which said means biasing said first gear into a floating position between said second and third gears is a spring means.

References Cited

UNITED STATES PATENTS

| 2,397,777 | 4/1946 | Colman | 74—409 |
| 2,877,658 | 3/1959 | Anthony | 74—409 |
| 2,895,342 | 7/1959 | Hayhurst | 74—409 |

FOREIGN PATENTS

| 393,245 | 8/1931 | Great Britain. |

LEONARD H. GERIN, *Primary Examiner.*

U.S. Cl. X.R.

74—417, 423